(12) United States Patent
Akhavan-Tafti et al.

(10) Patent No.: US 10,035,193 B2
(45) Date of Patent: Jul. 31, 2018

(54) METHOD FOR SYNTHESIZING PARTICLES IN THE PRESENCE OF A SOLID PHASE

(71) Applicant: AhuraTech LLC, Howell, MI (US)

(72) Inventors: Hashem Akhavan-Tafti, Howell, MI (US); Guoping Wang, Novi, MI (US); Barry A. Schoenfelner, Saugatuck, MI (US)

(73) Assignee: AhuraTech LLC, Brighton, MI (US)

( * ) Notice: Subject to any disclaimer, the term of this patent is extended or adjusted under 35 U.S.C. 154(b) by 16 days.

(21) Appl. No.: 15/240,407

(22) Filed: Aug. 18, 2016

(65) Prior Publication Data

US 2018/0050393 A1   Feb. 22, 2018

(51) Int. Cl.
| | |
|---|---|
| *B22F 9/24* | (2006.01) |
| *C01B 33/18* | (2006.01) |
| *C01B 39/22* | (2006.01) |
| *C01G 9/02* | (2006.01) |
| *C01G 49/02* | (2006.01) |
| *H01B 1/10* | (2006.01) |

(52) U.S. Cl.
CPC .............. *B22F 9/24* (2013.01); *C01B 33/18* (2013.01); *C01B 39/22* (2013.01); *C01G 9/02* (2013.01); *C01G 49/02* (2013.01); *H01B 1/10* (2013.01); *B22F 2009/245* (2013.01); *B22F 2301/255* (2013.01); *C01P 2006/42* (2013.01)

(58) Field of Classification Search
None
See application file for complete search history.

(56) References Cited

U.S. PATENT DOCUMENTS

| | | | |
|---|---|---|---|
| 7,991,421 B2 | 8/2011 | Gandhi et al. | |
| 7,994,421 B2 | 8/2011 | Williams et al. | |
| 8,232,221 B2 | 7/2012 | Kuznicki | |
| 8,313,797 B2 | 11/2012 | Mack et al. | |
| 8,383,674 B1 | 2/2013 | Posada | |
| 8,491,818 B2 | 7/2013 | Shih et al. | |
| 8,845,927 B2 | 9/2014 | Breen et al. | |
| 9,187,625 B2 | 11/2015 | Han et al. | |
| 9,314,849 B2 | 4/2016 | Tracy et al. | |
| 2004/0180785 A1 | 9/2004 | Jiang et al. | |
| 2006/0083694 A1 | 4/2006 | Kodas et al. | |

(Continued)

FOREIGN PATENT DOCUMENTS

CN   103639418 A   3/2014

OTHER PUBLICATIONS

Haranath et al, Journal of Applied Physics, 96(11), pp. 6700-6705, Dec. 2004.*

(Continued)

*Primary Examiner* — Erma C Cameron
(74) *Attorney, Agent, or Firm* — Harness, Dickey & Pierce, P.L.C.

(57) ABSTRACT

A method is presented for synthesizing particles in the presence of a solid phase. Of note, sorption is used to associate a precursor(s) for synthesizing the particles onto or into the surface of a host structure prior to the chemical reaction that results in the particles being formed in or on surface of the host structure. Particles produced by this method can be stored for long durations and released on-demand in a solvent of choice to form stable suspensions without the need for any additional surfactants or stabilizers.

36 Claims, 11 Drawing Sheets

(56) References Cited

U.S. PATENT DOCUMENTS

| | | | |
|---|---|---|---|
| 2006/0246121 A1 | 11/2006 | Ma et al. | |
| 2008/0193766 A1 | 8/2008 | Anderson et al. | |
| 2009/0098574 A1 | 4/2009 | Brisson et al. | |
| 2010/0224831 A1* | 9/2010 | Woo .................. | C09K 11/02 252/301.6 S |
| 2010/0231433 A1 | 9/2010 | Tishin et al. | |
| 2014/0221199 A1 | 8/2014 | Devi et al. | |
| 2015/0079310 A1 | 3/2015 | Park et al. | |
| 2015/0239049 A1 | 8/2015 | Tracy et al. | |

OTHER PUBLICATIONS

Nistor et al, Journal of Nanoscience and Nanotechnology, 11(10), pp. 9296-9303, 2011.*

Berezin, M.Y. "Nanotechnology for biomedical imaging and diagnostics: from nanoparticle design to clinical applications" John Wiley & Sons (2014).

Bol, A., et al "Luminescence quantum efficiency of nanocrystalline ZnS:Mn2+, surface passivation and Mn2+ concentration" J. Phys. Chem. B. 105(42) 10197-10202 (2001).

Carey, G., et al "Cleavable Ligands Enable Uniform Close Packing in Colloidal Quantum Dot Solids"; ACS Appl. Mater. Interface, 2015, 7(39), 21995-22000 (2015).

Chandrasekaran, P. et al "The effect of various capping agents on the surface modifications of sol-gel synthesized ZnO nanoparticles" J. Alloy. Compd. 2012, 540, 89-93 (2012).

Corrado, C., et al "Synthesis, structural, and optical properties of stable ZnS:Cu, C1 nanocrystals" J. Phys. Chem A. (2009).

Dang, T. et al "The influence of solvents and surfactants on the preparation of copper nanoparticles by a chemical reduction method" Ad. Nat. Sci. Nanosci. Nanotechnol. 2011, 2, 0254004 (2011).

Ho, C. "Micro/Nano technology systems for biomedical applications: Microfluidics, optics and surface chemistry" (2010).

Li, H., et al "Non-heavy-metal ZnS quantum dots with bright blue photoluminescence by a one-step aqueous synthesis" Nanotechnology, 2007, 18(20), 205604 (2007).

Manzoor, K., et al "Synthesis and photoluminescence properties of ZnS nanocrystals doped with copper and halogen" Mater. Chem. Phys. 2003, 82, pp. 718-725 (2003).

Mehta, S.K. et al "Evolution of ZnS nanoparticles via facile CTAB aqueous micellar solution route: a study on controlling parameters" Nanoscale Res. Lett. 2009, 4, 17-28 (2009).

Nath, S. et al "Green luminescence of ZnS and ZnS: Cu quantum dots embedded in zeolite matrix" J. Appl. Phys. 2009, 105, 094305 (2009).

Peng. W. Q., et al "Synthesis and photoluminescence of ZnS:Cu nanoparticles" Optic. Mater. 2006, 29, 313-317 (2006).

Severance, M. "Nanocrystalline Zeolintes: Synthesis, Mechanism, and Applications", Doctoral dissertation, The Ohio State University (2014).

Shen, L. et al "Growth and stablization of silver nanoparticles on carbon dots and sensing application" Langmuir, 2013, 20(52), 16135-16140 (2013).

Tiwari, A., et al "Synthesis structural and optical characterization of nanocrystalline ZnS:Cu embedded in silica matrix", Curr. Appl. Phys. 2012, 12(3), 632-636 (2012).

Li, Yaoxia et al., "Synthesis of ZnS Nanoparticles Into the Pore of Mesoporous Silica Spheres," Materials Letters, 2009, vol. 63, No. 12, pp. 1068-1070.

International Search Report and Written Opinion of the International Searching Authority regarding PCT/US2017/037667 dated Sep. 26, 2017.

International Search Report and Written Opinion of the International Searching Authority regarding PCT/US2017/037675 dated Sep. 27, 2017.

* cited by examiner

METHOD FOR SYNTHESIZING PARTICLES IN THE PRESENCE OF A SOLID PHASE

FIELD

The present disclosure relates to techniques for synthesizing particles in the presence of a solid phase.

BACKGROUND

Nanomaterials have attracted a significant amount of attention in science and industry. Due to quantum mechanical effects present at the atomic/molecular scales, nanomaterials exhibit unique electronic, optical and chemical properties. Because of these properties, nanoparticles have found many applications in opto-electronics (such as light emitting devices, displays, and solar cells), medicine (such as drug delivery, diagnostic and therapeutic applications), energy (such as storage and fuel catalysts) and environmental technologies (such as water purification). Despite many scientific efforts focusing on developing new nanomaterials, the synthesis and preparation of these materials in a scalable, inexpensive, efficient, and environmental-friendly manner still remains a challenge.

This section provides background information related to the present disclosure which is not necessarily prior art.

SUMMARY

This section provides a general summary of the disclosure, and is not a comprehensive disclosure of its full scope or all of its features.

In one aspect, a method is provided for synthesizing particles in the presence of a host structure. The method includes: adding one or more precursors to a liquid solvent; adding a host structure to the liquid solvent, where the host structure is in form of a solid phase; sorpting the precursor onto the surface of the host structure; initiating a chemical reaction that involves the precursor(s) and thereby results in particles formed in or on the surface of the host structure, where initiating a chemical reaction occurs after sorpting the precursor(s) onto the surface of the host structure; and separating the host structure with the associated particles from the liquid solvent. The step of adding one or more precursors can be done before or after the step of adding the host to the liquid solvent.

Sorpting the precursor onto the surface of the host structure can be achieved by absorption, adsorption or ion exchange.

In one embodiment, the chemical reaction is initiated by dispersing the host structure into a reaction solvent and introducing a counter ion into the reaction solvent.

In another embodiment, the chemical reaction is initiated by dispersing the host structure into a reaction solvent and introducing a reducing agent or a catalyst into the reaction solvent.

In some embodiments, the host structure with the associated particles is separated from the solvent by filtering the reaction solvent. The separated host structures can also be washed to remove residual unreacted species therefrom.

After storage, the particles can be released on demand from the host structure. For example, the host structure may be dispersed into the secondary solvent and sonicated. The released particles can then be separated from the host structure by centrifugation and removed from the secondary solvent.

Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1A:
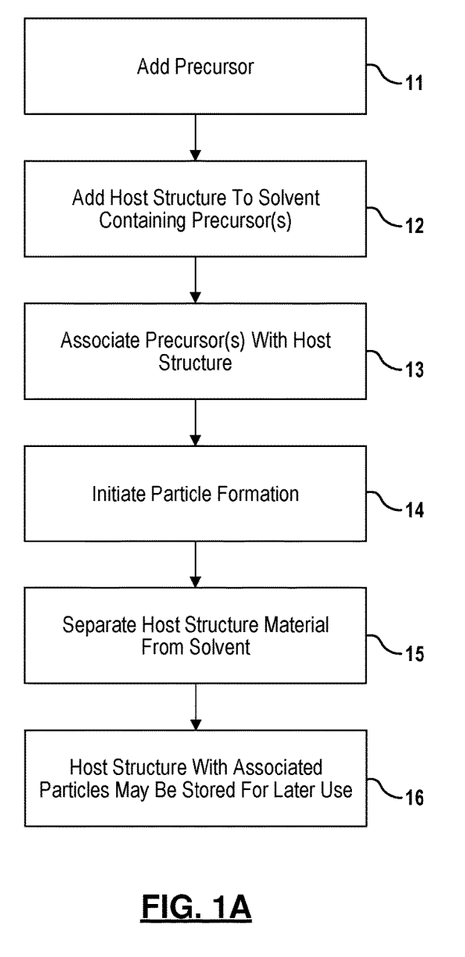
FIG. 1A is a flowchart depicting a method for synthesizing nanoparticles in the presence of a solid phase.

FIG. 1A provides an overview of a method for synthesizing particles on or in a host structure. Synthesized particles have a characteristic size (diameter) less than 100 micrometers and preferably in the range from 100 micrometer to 0.1 nanometers. Synthesized particles can include but are not limited to metal particles (e.g., Au, Ag, Ni and other metals), metal alloys particles (e.g., Au—Ag and other alloys), metal oxides particles (e.g., ZnO and other oxides), semiconductor particles (e.g., ZnS with Mn as dopant and other semiconductors ranging from elemental semiconductors like Si, Ge to combinations of group IIB-VI like CdS, III-V like GaAs, IV-VI like PbS with trace dopants chosen from transition metals like Cu or rare earth metals like Sm), magnetic particles (e.g., $Fe_2O_3$, Ni can be extended to other super-paramagnetic materials), core-shell nanoparticles, and carbon-based particles (e.g., latex can be extended to polymeric and small molecule carbon based materials).

Precursors are added at 11 to a primary solvent. In one example, the precursor is dissolved in a liquid solvent (i.e., primary solvent). In the example embodiments set forth below, precursors are typically chosen from salts that are soluble in the primary solvent which contain a cation or anion of interest. Precursors containing a metal source may be chosen from chlorides, acetates, or nitrates of the metal cations of interest; whereas, anions may be chosen from fluorides, chlorides, bromides, iodides, chlorate, perchlorate, bromate, sulfate, nitrate, nitrite, hexafluorophosphate, tetrafluoroborate, trifluoromethanesulfonate, acetate or the like. Precursors containing the anion source used in the example embodiments are chosen from alkali metal salts (Li, Na, K, Rb, Cs), thiourea, thioamides and dithionite salts. Other types of precursors are also contemplated by this disclosure.

Water and ethanol are example solvents. It is understood that the primary solvent may be chosen from polar protic solvents (e.g., water, alcohols, dimethoxyethane, amines, nitromethane, acids-formic, acetic), or polar aprotic solvents (e.g., DMSO, sulfolane, DMF, NMP, acetonitrile, butyronitrile, acetone, ethyl acetate, tetrahydrofuran, propylene carbonate, polar halogenated solvents like dichloromethane). Other types of solvents are also contemplated within the scope of this disclosure.

Particles are synthesized in the presence of a host structure (e.g., a solid phase matrix). To do so, the host structure is added at 12 to the solvent containing the precursor. Although nonporous materials may be used, the host structure is preferably a porous material with pores size from 100 micrometers to one Angstrom. The host structure may also be in the form of pellets, powders, washcoats, membranes and natural or synthetic fibers. Example host structures include but are not limited to molecular sieves (e.g., zeolite 13X), silica gel, porous alumina, zeolites, cross-linked dextran, aerogel, xerogel, metal-organic frameworks, and ion exchange media (cationic, anionic and amphoteric).

Figure 2A:
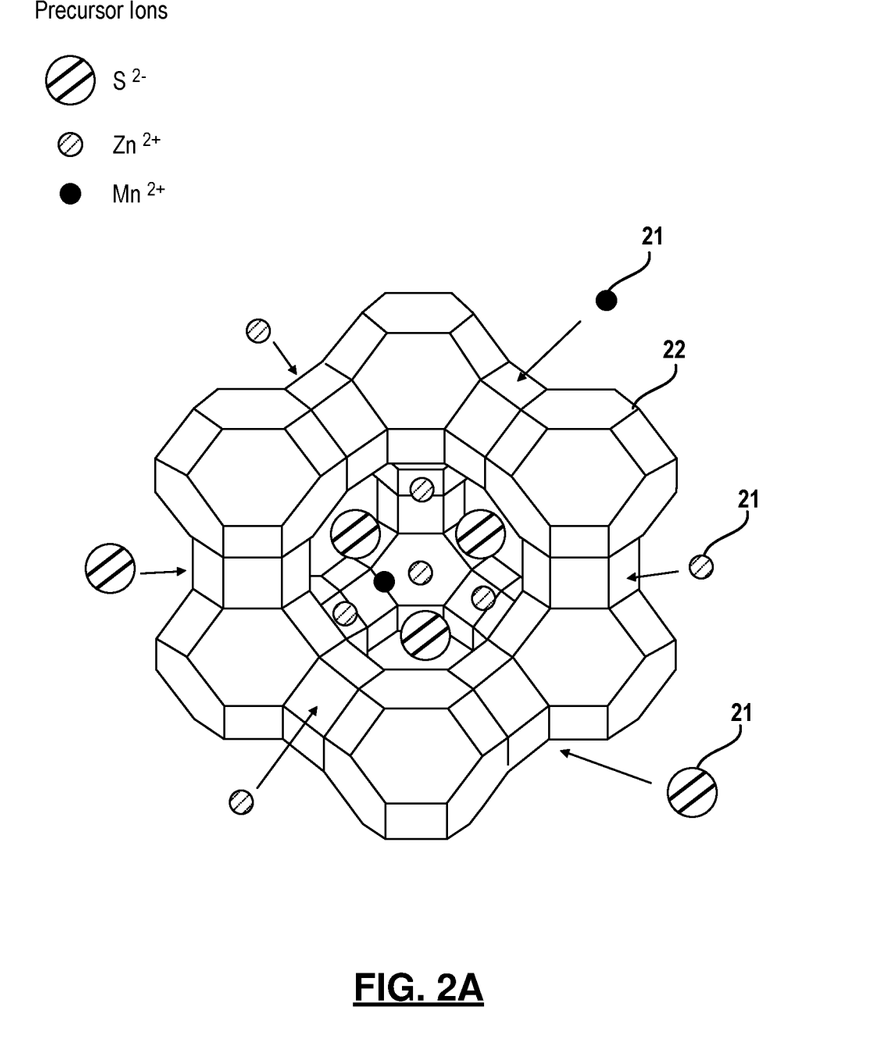
FIG. 2A is a diagram depicting an example of precursor ions adsorbed onto a host structure.

The precursor is then associated at 13 with the host structure. More specifically, sorption (i.e., absorption, adsorption or ion exchange) is used to associate the precursor with the host structure. In one example, the precursor 21 is associated with a solid phase matrix 22 by physical adsorption of the precursor on the matrix as seen in FIG. 2A. The precursor can be adsorbed, for example using a rotary evaporator to dry the solution which contains the precursor. In another example, the precursor is associated with a solid phase matrix by swelling of a hydrogel serving as a host structure. Precursors may be associated with the matrix using other methods including but not limited to covalent bonding, ionic bonding, polar covalent bonding, hydrogen bonding, electrostatic forces, electrical double layer forces and Van der Waals forces.

Next, a chemical reaction that involves the precursor is initiated at 14 and thereby results in particles formed in or on surface of the host structure. To do so, the solid phase that is impregnated with the precursors is first redispersed in a reaction solvent. The reaction solvent can be the same as the original primary solvent or an alternate solvent in which the reactants are soluble. Water and ethanol are again example reaction solvents. The reaction solvent may also be chosen from polar protic solvents (e.g., water, alcohols, dimethoxyethane, amines, nitromethane, acids-formic, acetic), or polar aprotic solvents (e.g., DMSO, sulfolane, DMF, NMP, acetonitrile, butyronitrile, acetone, ethyl acetate, tetrahydrofuran, propylene carbonate, polar halogenated solvents like dichloromethane). Other types of reaction solvents are also contemplated within the scope of this disclosure.

Figure 2B:
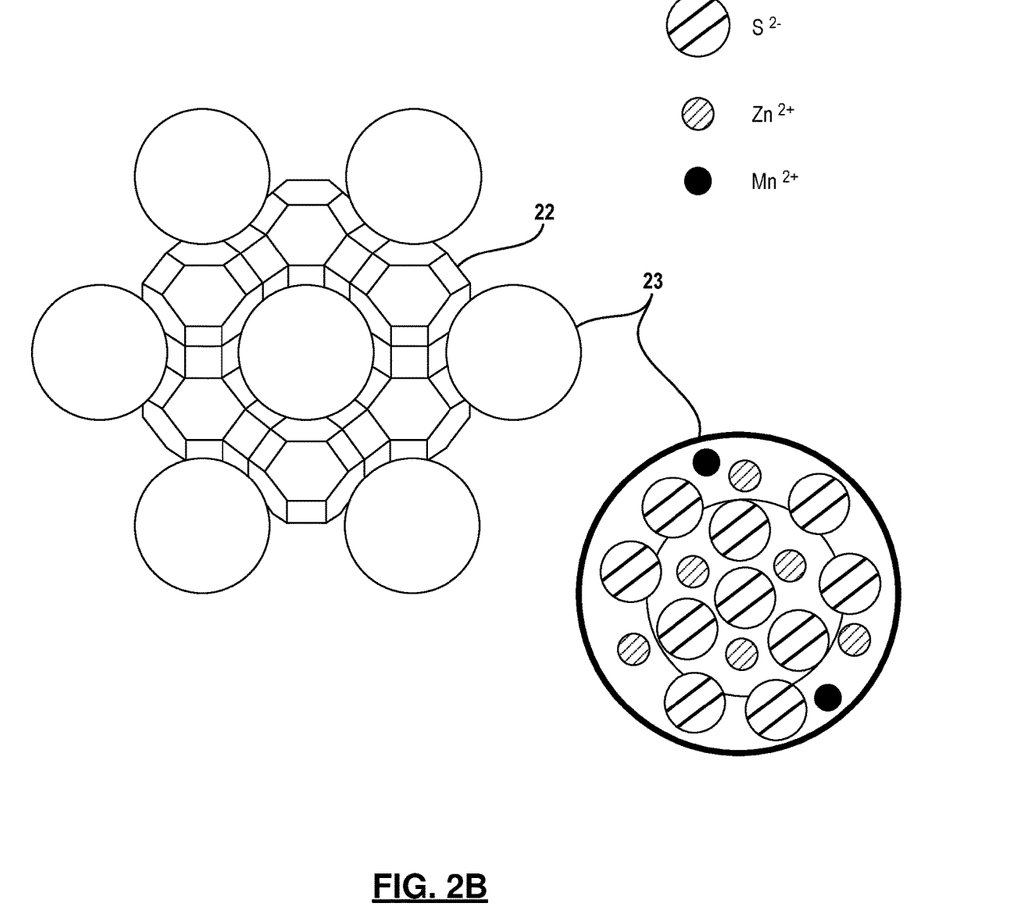
FIG. 2B is a diagram depicting an example of particles formed on or within the host structure.

The particles 23 nucleate and grow in the presence of the solid phase 22 as seen in FIG. 2B. In one example, the chemical reaction is triggered by heating. Alternatively or additionally, the chemical reaction is triggered by the addition of a solution containing a chemical agent (e., a reducing agent, a catalyst, etc.) to the reaction vessel. The nucleation of the particles can also be triggered by cooling, imposing pressure changes, presence of oxidizing or reducing agents, photochemical stimulation, exposure to microwave radiation, electrical energy, mechanical energy such as sonication, stirring, and shearing.

Once the reaction is concluded and particles are formed on the solid phase, the excess reactants are removed. That is, the host structure with the associated particles is separated at 15 from the reactants and/or solvent. In one example, the solid phase is washed using the primary solvent and the solid phase is removed by centrifugation of the wash mixture and/or filtration. Pressure, vacuum, centrifugal or gravity aided filtration, trituration, solvent extraction, dialysis, or centrifugation and removal of supernatant can also be used to isolate the solid phase matrix carrying the particles formed in-situ.

Long-term preservation of the synthesized particles may be carried out by storing the solid matrix containing the particles in a sealed container as indicated at 16. For example, the solid matrix carrying the particles can be immersed in an inert liquid such as alkanes, oils, halogenated solvents. Alternately, the solid matrix containing the particles may be dried for example using air, noble gasses, carbon dioxide, or nitrogen, and then stored in a container. In some embodiments, the container may be vacuum sealed. It is also envisioned that the container may be configured to minimize exposure of the contents to light, oxygen and/or humidity. The particles may be released on demand simply by dispersing the solid matrix in a secondary solvent of choice and the suspension containing particles is reconstituted through the release and filtration methods described below.

Depending on the application, the particles may remain bound to the solid phase until the time of use. Different techniques can be used to release particles from the host structure. For example, the particles can be released from a solid matrix into a desired solvent as described in relation to FIG. 1B. The solid matrix is first added or placed into a secondary solvent as indicated at 17. It is understood that the secondary solvent may be the same as the primary solvent or another solvent of choice. Secondary solvents may be chosen from polar protic solvents (water, alcohols, dimethoxyethane, amines, nitromethane, acids-formic, acetic), polar aprotic solvents (DMSO, sulfolane, DMF, NMP, acetonitrile, butyronitrile, acetone, ethyl acetate, tetrahydrofuran, propylene carbonate, polar halogenated solvents like dichloromethane). Water and ethanol were used in the example embodiments described below.

Figure 1B:
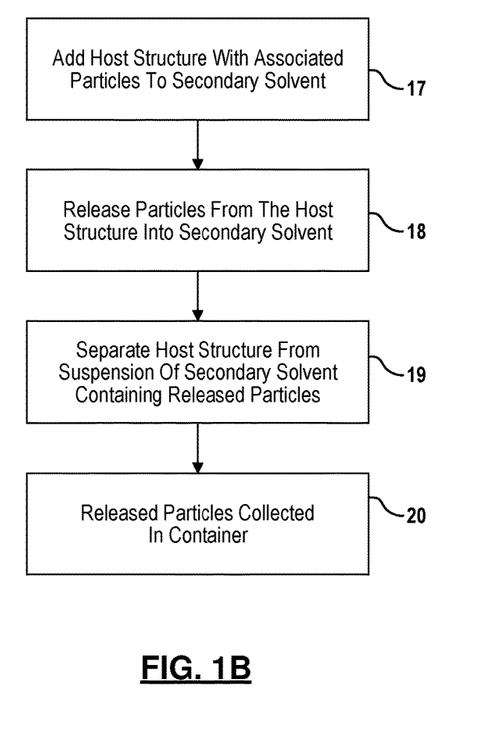
FIG. 1B is a flowchart depicting a method for releasing the nanoparticles from the host structure.

The particles are then released at 18 from the host structure into the secondary solvent, for example by sonication. Alternately, particles may be released from the host structure by heating, cooling, sonication, treatment with reducing or oxidizing agents, hydrolysis, acid or base treatment, ion exchange, cleaving linkers by photocleavage, enzymatic cleavage, catalytic cleavage, dissolving the matrix in an etching solvent, swelling the matrix in order to allow particles to escape the enlarged pores, or using an electrostatic-based release mechanism.

The released particles are then separated at 19 from the host structure for example using centrifugation. Other techniques for separating the particles from the host structure are also contemplated by this disclosure. Lastly, the particles are collected at 20 in a container. In one example, the supernatant is decanted into a separate vial.

To demonstrate the wide range of applicability of the proposed method for synthesizing small particles in the presence of a solid, four examples are further described below.

Figure 3A:
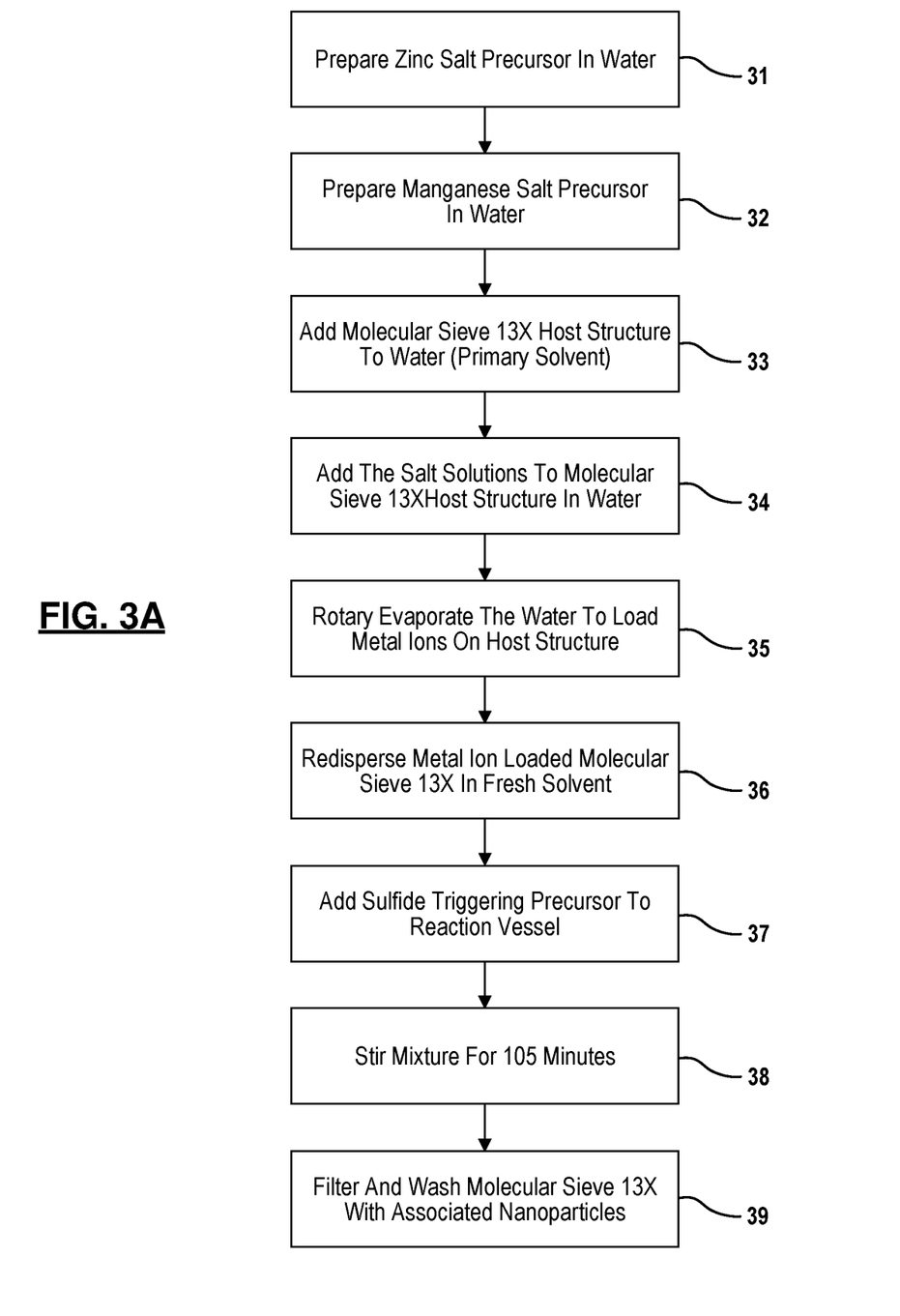
FIG. 3A is a flowchart depicting a first example embodiment for synthesizing nanoparticles.

In a first example embodiment, zinc sulfide (ZnS) with manganese as dopant is synthesized in the presence of a molecular sieve as described in relation to FIG. 3A. Synthesis is carried out with a molecular sieve 13X serving as the solid phase and using water as the primary and secondary solvent. A 1 M aqueous solution of the zinc precursor is prepared at 31 by dissolving 6.03 g of [Zn(OAc)$_2$.2H$_2$O] in 25 mL of distilled water. A 0.1 M solution of the manganese precursor is prepared at 32 by the dissolving 245 mg of Mn(OAc)$_2$ in 10 mL of distilled water. A 1 M aqueous solution of Na$_2$S is prepared by dissolving 6 g of Na$_2$S.7H$_2$O in 25 mL of distilled water. Next, 8 g of molecular sieve 13X is added at 33 to a 250 mL flask containing 80 mL of distilled water and the mixture is rapidly stirred. 16 mL of the 1 M zinc acetate solution and 1.6 mL of 0.1 M manganese acetate solution are mixed together and added to a mixing flask as indicated at 34. The mixture is then stirred at room temperature for 60 minutes. The mixture of the metal precursors produces a 1% molar basis of Mn(II) dopant. Using a rotary evaporator, the precursor solutions are dried at 68° C. to adsorb the metal salts at 35 into the pores of the molecular sieves. The dry solids are then transferred at 36 into another reaction flask and 80 mL of distilled water is added to the reaction flask. 16 mL of the 1 M sodium sulfide solution is added drop-wise at 37 to the reaction vessel with rapid stirring under nitrogen. The mixture becomes slightly pink colored. The mixture is continuously stirred at 38 under nitrogen for 45 minutes at room temperature followed by an additional 60 minutes at 90° C. The mixture is then gradually cooled down to room temperature. The molecular sieve (i.e., solid matrix) containing the particles is extracted at 39 from the reaction mix by centrifugation and decanting the supernatant liquid. Several wash steps can also be carried out. Example wash steps can include: dispersion of solids in fresh pure solvent, shaking the mix, centrifuge at 4000 rpm for 10 minutes followed by decanting and discarding the supernatant wash liquid.

Figure 3B:
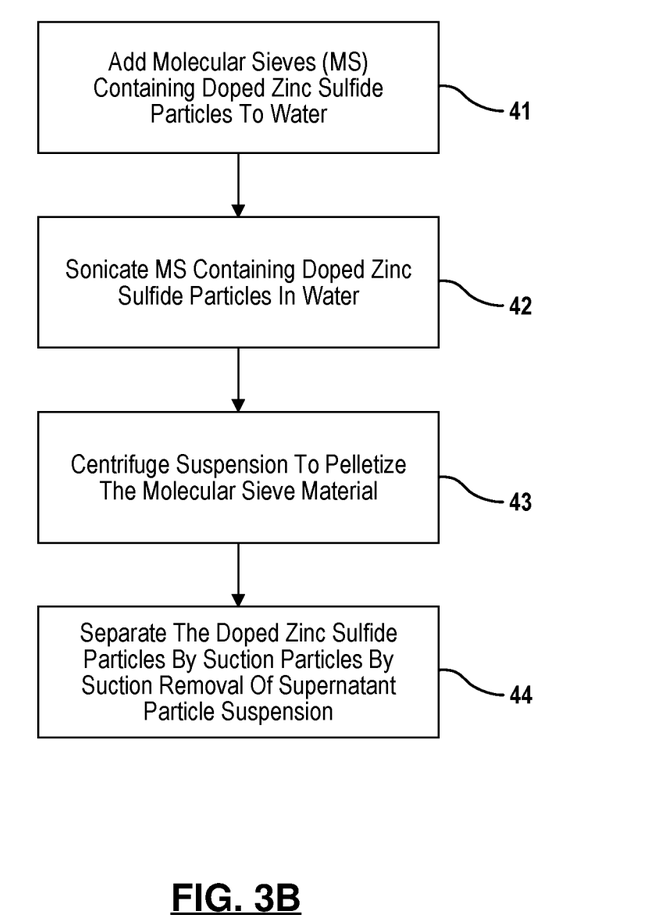
FIG. 3B is a flowchart depicting a first example embodiment for releasing nanoparticles.

Referring to FIG. 3B, the nanoparticles are subsequently released from the molecular sieve. More specifically, the solid matrix with the particles is dispersed in fresh solvent at 41 and sonicated in an ultrasonic bath at 42. As indicated at 43, the mixture is centrifuged at 4000 rpm for 10 minutes and the cloudy supernatant suspension containing the released particles is collected in a separate tube. To separate the finer particles (nanometer sized), the cloudy suspension is further centrifuged at 14,000 rpm for 10 minutes. The subsequent transparent supernatant containing the nanoparticles is collected at 44 in another separate vial. The presence of nanoparticles in the transparent supernatant was confirmed by electron microscopy (TEM) and their absorption spectrum using UV-Vis spectrometry. A bright orange luminescence was observed from the nanoparticle suspension when exposed to 365 nm UV light.

Figure 4A:
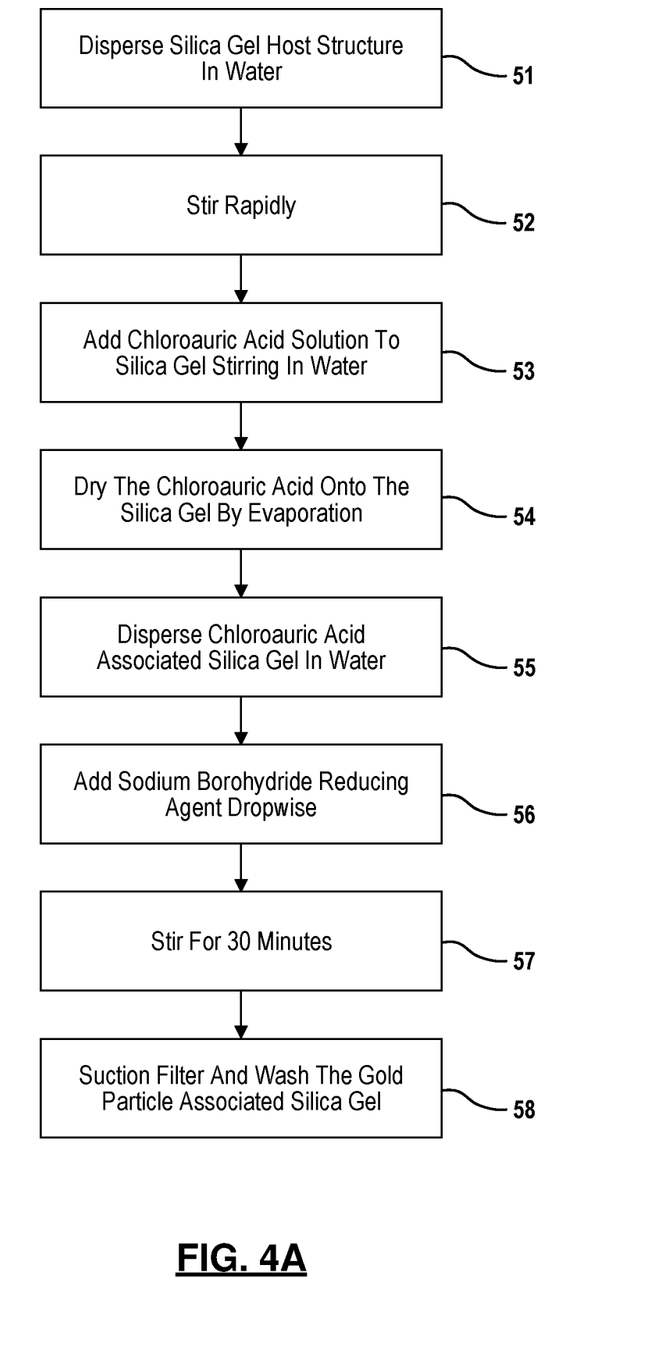
FIG. 4A is a flowchart depicting a second example embodiment for synthesizing nanoparticles.

In a second example embodiment, metal particles are synthesized as described in relation to FIG. 4A. Synthesis is carried out in the presence of silica particles which serve as the solid phase. Water is used as the primary and secondary solvent. In a 100 mL round bottom flask, 1 g of silica gel (230-400 Mesh, 46-63 μm) is dispersed at 51 in 20 mL of distilled water. The mixture is rapidly stirred at 52. While stirring, 4 mL of the 0.01M HAuCl$_4$ solution is added to the flask at 53. For ideal results, the mixture is stirred overnight. The suspension is rotary evaporated at 50° C. to allow the metal precursor to fully adsorb onto the silica gel as indicated at 54. The dry solids are then dispersed at 55 in 20 mL fresh distilled water. While stirring under N$_2$ gas purge, 1 mL of sodium borohydride solution is added at 56 to the reaction mix, dropwise. The mixture is stirred at 57 for an additional 30 minutes. The reaction mixture can be suction filtered at 58 through filter paper to isolate the silica gel containing the gold particles. Several wash steps can be performed as well. Example wash steps may include: disperse the solid matrix in fresh solvent, shake well, centrifuge at 4000 rpm for 10 minutes, and decant and discard the wash liquid remaining atop the solids.

Figure 4B:
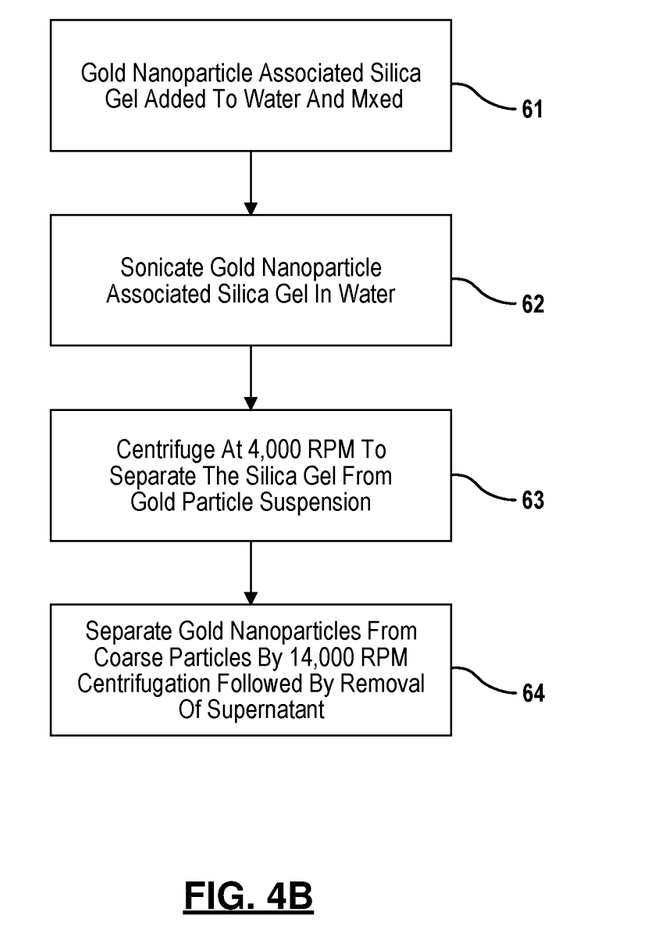
FIG. 4B is a flowchart depicting a second example embodiment for releasing nanoparticles.

Referring to FIG. 4B, the nanoparticles were subsequently released from the silica gel. To release the nanoparticles, the silica gel is dispersed in 13 mL of distilled water, vortex-mixed and shaken well to form a slurry as indicated at 61. The slurry is sonicated at 62 for 10 minutes in an ultrasonic bath, followed by centrifugation at 63 to collect the solid matrix at the bottom. The supernatant containing the gold particles is decanted. To obtain finer particles (nanometer sized), a follow-up high speed centrifugation at 14,000 rpm for 10 minutes is carried out on the particle laden liquid and the supernatant is decanted at 64 into a separate vial. The presence of gold nanoparticles in the supernatant was confirmed using electron microscopy and UV-Vis spectrometry.

Figure 5A:
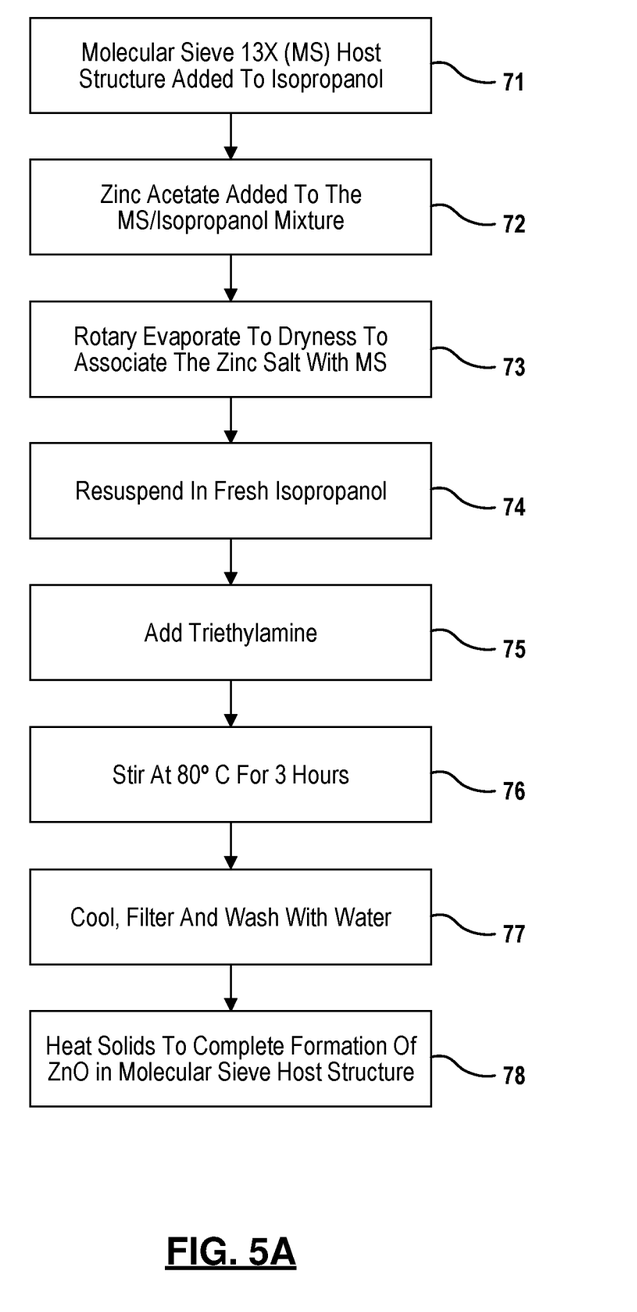
FIG. 5A is a flowchart depicting a third example embodiment for synthesizing nanoparticles.

In a third example embodiment, zinc oxide particles are synthesized as described in relation to FIG. 5A. Synthesis is carried out in the presence of molecular sieve 13X which serves as a solid phase. Isopropanol and water serve as the primary and secondary solvent, respectively. To begin, 2 g of molecular sieve 13X is added at 71 to a flask containing 25 mL of isopropanol (i.e., primary solvent). While rapidly stirring, 4 mmol (736 mg) Zn(OAc)$_2$ (i.e., precursor) is added at 72 to the flask and the mixture is heated to 80° C. for 1 hour. The mixture is rotary evaporated at 73 to dryness. Remaining dry solids are dispersed at 74 in reaction flask containing 25 mL of fresh isopropanol while rapidly stirring at 80° C. Triethylamine is added at 75 in excess molar ratio (at least 40 mmol) to the reaction flask and the mixture was continuously stirred and heated at 80° C. for 3 hours as indicated at 76. At 77, the mixture is cooled down and the solids are extracted by filtration and the excess solvent was discarded. The solids are washed with fresh isopropanol followed by distilled water. The solid matrix is then heated at 78 at 110° C. overnight to convert zinc hydroxide formed in the matrix to zinc oxide. Formation of ZnO particles was confirmed by X-ray diffraction (XRD).

Figure 5B:
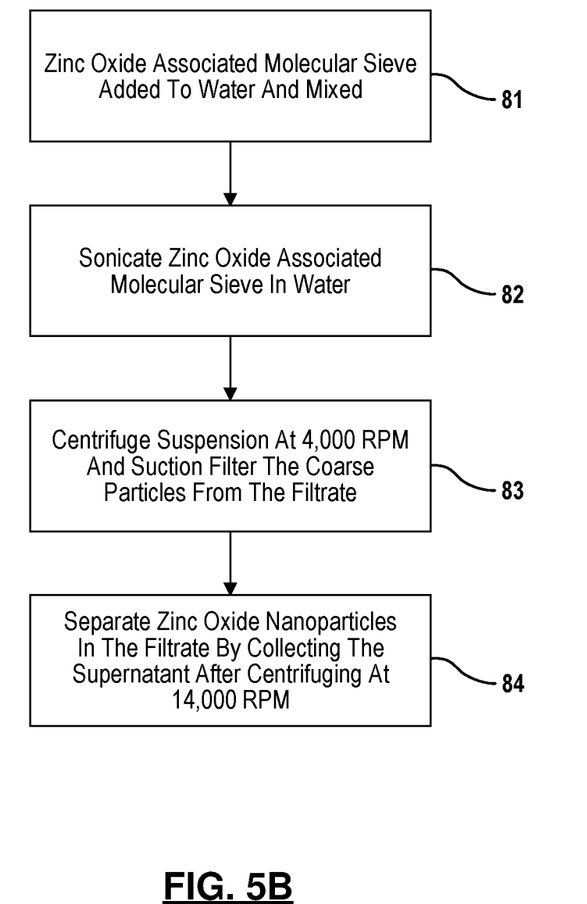
FIG. 5B is a flowchart depicting a third example embodiment for releasing nanoparticles.

Referring to FIG. 5B, the zinc oxide particles were subsequently released from the molecular sieve. To release the nanoparticles, solids are dispersed at 81 in 13 mL of distilled water (secondary solvent) and sonicated at 82 in an ultrasonic bath. As indicated at 83, the mixture is then centrifuged at 4000 rpm for 10 minutes to separate the solid matrix from the cloudy supernatant containing the released particles. To separate the finer particles (nanometer sized), the cloudy suspension collected earlier is centrifuged at 14,000 rpm for 10 minutes and the clear the supernatant containing the nanoparticles is decanted at 84 into a separate vial. The presence of nanoparticles in the transparent supernatant was confirmed by electron microscopy (TEM).

Figure 6A:
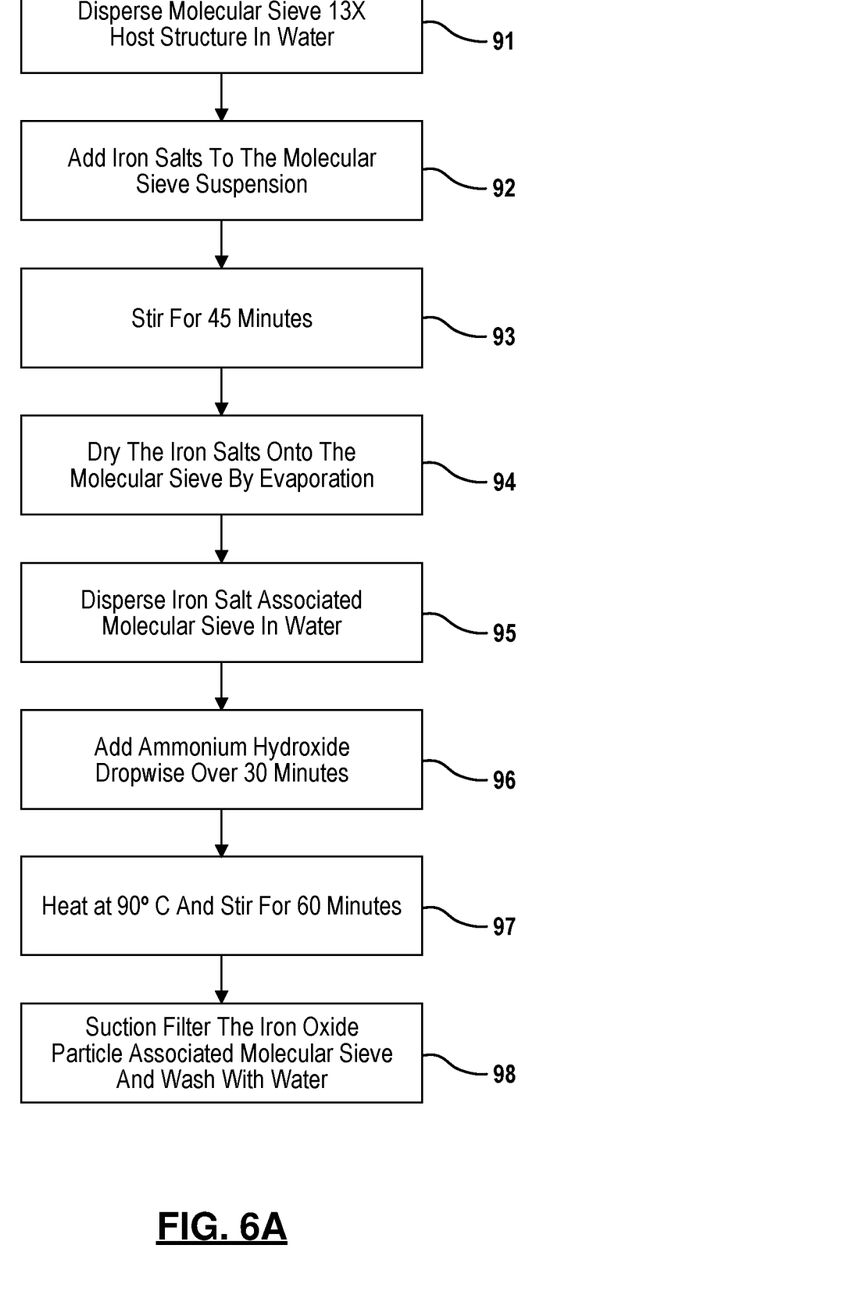
FIG. 6A is a flowchart depicting a fourth example embodiment for synthesizing nanoparticles.

In a fourth example embodiment, magnetic particles are synthesized as described in relation to FIG. 6A. Synthesis is carried out in a molecular sieve 13X which serves as the solid phase. Water is used as the primary and secondary solvent. 2 g of molecular sieve 13X is added at 91 to a flask containing 25 mL of distilled water. 1 millimole of FeCl$_2$ and 2 millimoles of FeCl$_3$ is then added at 92 to the flask (optimum molar Fe$^{2+}$/Fe$^{3+}$ ratio is in the range of 0.4-0.6). The mixture is stirred at 93 for 45 minutes. The mixture is rotary evaporated to dryness at 94 to adsorb the precursors onto the solid matrix. Dry solids are dispersed at 95 in 25 mL of distilled water. Next, a solution containing 16 millimoles of ammonium hydroxide is added dropwise at 96 over a 30 minute period while the reaction vessel was rapidly stirred under a $N_2$ gas atmosphere. The reaction vessel is then heated to 90° C. for 1 hour under $N_2$ gas purge with stirring as indicated at 97. The reaction mixture is cooled to room temperature and the solid matrix containing the particles is removed at 98 by suction filtration and washed with distilled water.

Figure 6B:
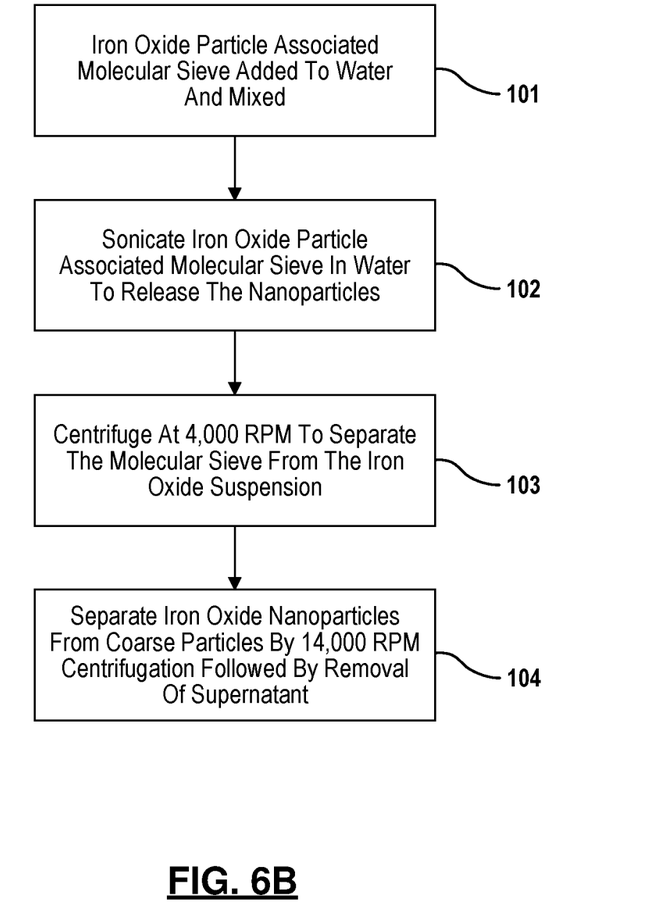
FIG. 6B is a flowchart depicting a fourth example embodiment for releasing nanoparticles Corresponding reference numerals indicate corresponding parts throughout the several views of the drawings.

Referring to FIG. 6B, the nanoparticles were subsequently released from the molecular sieves. Solids containing the particles were dispersed in 13 mL of distilled water, vortex-mixed and shaken well to form a slurry at 101. The slurry is sonicated in an ultrasonic bath for 10 minutes at 102, followed by centrifugation at 4000 rpm for 10 minutes to separate the solid matrix from the cloudy suspension containing the released magnetic particles as indicated at 103. To separate the finer particles (nanometer sized), the cloudy suspension is centrifuged at 14,000 rpm for 10 minutes and the clear the supernatant containing the nanoparticles is decanted at 104 into a separate vial.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for synthesizing particles on or in a host structure, comprising:
   adding one or more precursors to a liquid solvent;
   adding a host structure to the liquid solvent, where the host structure is in form of a solid phase;
   sorpting the one or more precursors onto surface of the host structure;
   removing the liquid solvent;
   redispersing the host structure in a reaction solvent;
   initiating a chemical reaction that involves the one or more precursors, where the chemical reaction results in particles formed in or on surface of the host structure, where initiating a chemical reaction occurs after sorpting the precursor onto surface of the host structure and the particles are sized less than 100 micrometers; and
   separating the host structure, along with the particles formed in or on the surface of the host structure, from the reaction solvent.

2. The method of claim 1 further comprises adding the precursor to the liquid solvent prior to adding the host structure to the liquid solvent.

3. The method of claim 1 further comprises adding the host structure to the liquid solvent prior to adding the precursor to the liquid solvent.

4. The method of claim 1 wherein the host structure includes pores which retain the particles and the pores are sized less than 100 micrometers.

5. The method of claim 1 wherein the host structure is further defined as a solid phase matrix and the precursor is a salt soluble in the liquid solvent.

6. The method of claim 1 wherein the liquid solvent is selected from a group consisting of a polar protic solvent and a polar aprotic solvent.

7. The method of claim 1 further comprises sorpting the precursor onto the surface of the host structure by one of absorption, adsorption or ion exchange.

8. The method of claim 1 wherein sorpting the precursor and removing the liquid solvent are achieved by evaporating the liquid solvent.

9. The method of claim 7 wherein the precursor is a metal ion and the step of initiating a chemical reaction includes introducing a counter ion to the metal ion into the reaction solvent, where the reaction solvent is same or different from the liquid solvent.

10. The method of claim 7 wherein the step of initiating a chemical reaction includes introducing a reducing agent or a catalyst into the reaction solvent, where the reaction solvent is same or different from the liquid solvent.

11. The method of claim 1 further comprises separating the host structure, along with the particles formed in or on the surface of the host structure, from the solvent by filtering the reaction solvent.

12. The method of claim 11 further comprises washing the separated host structures to remove excess reactants therefrom.

13. The method of claim 1 further comprises releasing the particles from the host structure into a secondary solvent after the step of separating the host structure from the reaction solvent.

14. The method of claim 13 wherein the particles are released from the host structure by dispersing the host structure into the secondary solvent and sonication of the secondary solvent.

15. The method of claim 14 further comprises separating the released particles from the host structure by centrifugation and removing the host structure from the secondary solvent.

16. The method of claim 13 wherein the secondary solvent is selected from a group consisting of nonpolar solvents, polar protic solvents and polar aprotic solvents.

17. The method of claim 1 wherein the particles are selected from a group consisting of metals, metal alloys, metal oxides, metal chalcogenides, and magnetic materials.

18. The method of claim 1 wherein the particles are semiconductors.

19. The method of claim 1 wherein the particles are semiconductors with dopants.

20. The method of claim 19 wherein the particles are zinc sulfide with manganese as dopant.

21. The method of claim 1 wherein the host structure is selected from a group consisting of molecular sieves, silica, alumina, zeolites, cross-linked dextran, aerogel, xerogel, metal-organic frameworks and ion exchange media.

22. The method of claim 1 wherein the host structure is one of pellets, powders, washcoats, membranes, natural fibers or synthetic fibers.

23. The method of claim 1 wherein the particles are further defined as core-shell nanoparticles.

24. A method for synthesizing nanoparticles in or on a host structure, comprising:
dissolving a precursor in a liquid solvent;
adding a host structure into the liquid solvent, where the host structure is in form of a solid phase;
sorpting the one or more precursors onto surface of the host structure;
removing the liquid solvent;
redispersing the host structure in a reaction solvent;
initiating a chemical reaction that involves the precursor and the chemical reaction results in nanoparticles formed in or on the surface of the host structure, where the nanoparticles are sized less than 100 micrometers;
separating the host structure, along with the nanoparticles formed in or on the surface of the host structure, from the solvent;
storing the host structure, along with the nanoparticles formed in or on the surface of the host structure, for a period of time; and
releasing the nanoparticles from the host structure into a secondary solvent after the step of storing the host structure, where the secondary solvent is same as or different than the liquid solvent.

25. The method of claim 24 further comprises sorpting the precursor onto the surface of the host structure before initiating the chemical reaction.

26. The method of claim 25 further comprises sorpting the precursor onto the surface of the host structure by one of absorption, adsorption or ion exchange.

27. The method of claim 26 wherein the precursor is a metal ion and the step of initiating a chemical reaction includes introducing a counter ion to the metal ion into the reaction solvent, where the reaction solvent is same as or different than the liquid solvent.

28. The method of claim 26 wherein the step of initiating a chemical reaction includes introducing a reducing agent or a catalyst into the reaction solvent, where the reaction solvent is same as or different than the liquid solvent.

29. The method of claim 24 further comprises separating the host structure, along with the nanoparticles from the solvent by filtering the secondary solvent.

30. The method of claim 29 further comprises washing the separated host structures to remove excess reactants therefrom.

31. The method of claim 24 wherein the nanoparticles are released from the host structure using sonication.

32. The method of claim 31 further comprises separating the released nanoparticles from the host structure by centrifugation and removing the host structure from the secondary solvent.

33. The method of claim 24 wherein the nanoparticles are selected from a group consisting of metals, metal alloys, metal oxides, and magnetic materials.

34. The method of claim 24 wherein the nanoparticles are semiconductors.

35. The method of claim 24 wherein the host structure is selected from a group consisting of molecular sieves, silica, alumina, zeolites, cross-linked dextran, aerogel, xerogel, metal-organic frameworks and ion exchange media.

36. The method of claim 24 wherein the host structure is one of pellets, powders, washcoats, membranes, natural fibers or synthetic fibers.

* * * * *

UNITED STATES PATENT AND TRADEMARK OFFICE
CERTIFICATE OF CORRECTION

PATENT NO. : 10,035,193 B2
APPLICATION NO. : 15/240407
DATED : July 31, 2018
INVENTOR(S) : Hashem Akhavan-Tafti et al.

It is certified that error appears in the above-identified patent and that said Letters Patent is hereby corrected as shown below:

On the Title Page

Page 2, item (56), Other Publications, Column 1, Line 7, please delete "ZnS:Mn2+," and insert --ZnS:$Mn^{2+}$,-- therefor.

Page 2, item (56), Other Publications, Column 1, Line 7, please delete "Mn2+" and insert --$Mn^{2+}$-- therefor.

Page 2, item (56), Other Publications, Column 1, Line 16, please delete "C1" and insert --Cl-- therefor.

Page 2, item (56), Other Publications, Column 2, Line 17, please delete "Zeolintes:" and insert --Zeolites:-- therefor.

Page 2, item (56), Other Publications, Column 2, Line 20, please delete "stablization" and insert --stabilization-- therefor.

In the Drawings

Sheet 4 of 11, FIG. 3A, Reference Numeral 34, please delete "13XHost" and insert --13X Host-- therefor.

Sheet 7 of 11, FIG. 4B, Reference Numeral 61, please delete "Mxed" and insert --Mixed-- therefor.

Sheet 8 of 11, FIG. 5A, Reference Numeral 76, please delete "80° C" and insert --80 °C-- therefor.

Sheet 10 of 11, FIG. 6A, Reference Numeral 97, please delete "90° C" and insert --90 °C-- therefor.

In the Specification

Signed and Sealed this
Sixteenth Day of April, 2019

Andrei Iancu
*Director of the United States Patent and Trademark Office*

CERTIFICATE OF CORRECTION (continued)
U.S. Pat. No. 10,035,193 B2

Detailed Description, Column 2, Line 58, please delete "Fe2O3" and insert --$Fe_2O_3$-- therefor.

Detailed Description, Column 5, Line 20, please delete "68° C" and insert --68 °C-- therefor.

Detailed Description, Column 5, Line 29, please delete "90° C" and insert --90 °C-- therefor.

Detailed Description, Column 5, Line 63, please delete "50° C" and insert --50 °C-- therefor.

Detailed Description, Column 6, Line 30, please delete "80° C" and insert --80 °C-- therefor.

Detailed Description, Column 6, Line 34, please delete "80° C" and insert --80 °C-- therefor.

Detailed Description, Column 6, Line 36, please delete "80° C" and insert --80 °C-- therefor.

Detailed Description, Column 6, Line 41, please delete "110° C" and insert --110 °C-- therefor.

Detailed Description, Column 7, Line 5, please delete "90° C" and insert --90 °C-- therefor.